United States Patent [19]

Chang et al.

[11] Patent Number: 4,902,663
[45] Date of Patent: Feb. 20, 1990

[54] ACTIVE AMORPHOUS MIXED OXIDES

[75] Inventors: Clarence D. Chang, Princeton; Cynthia T-W. Chu, Princeton Junction, both of N.J.

[73] Assignee: Mobil Oil Corp., New York, N.Y.

[21] Appl. No.: 113,317

[22] Filed: Oct. 28, 1987

[51] Int. Cl.$^4$ .............................................. B01J 21/00
[52] U.S. Cl. ..................................... 502/242; 502/246; 502/250; 502/258; 502/263; 423/327; 423/335
[58] Field of Search ............... 502/232, 233, 240, 250, 502/263, 258, 242, 246; 423/327, 335

[56] References Cited

U.S. PATENT DOCUMENTS

| | | | |
|---|---|---|---|
| 3,354,078 | 11/1967 | Miale et al. | 208/120 |
| 3,644,220 | 2/1972 | Kearby | 252/442 |
| 4,217,240 | 8/1980 | Bergna | 423/328 |
| 4,272,409 | 6/1981 | Bergna | 252/455 R |
| 4,427,787 | 1/1984 | Miale et al. | 502/71 |
| 4,427,788 | 1/1984 | Miale | 502/71 |
| 4,427,789 | 1/1984 | Miale et al. | 502/71 |
| 4,427,791 | 1/1984 | Miale et al. | 502/203 |
| 4,435,516 | 3/1984 | Chang et al. | 502/71 |
| 4,452,909 | 6/1984 | Yang | 502/69 |
| 4,468,475 | 8/1984 | Kuehl | 502/71 |
| 4,477,582 | 10/1984 | Miale | 502/26 |
| 4,478,950 | 10/1984 | Chu | 502/85 |
| 4,500,418 | 2/1985 | Miale et al. | 208/114 |
| 4,500,420 | 2/1985 | Miale et al. | 208/116 |
| 4,500,422 | 2/1985 | Miale et al. | 208/117 |
| 4,513,091 | 4/1985 | Chang et al. | 502/71 |
| 4,538,016 | 8/1985 | Miale et al. | 585/408 |
| 4,550,092 | 10/1985 | Chang et al. | 502/71 |
| 4,559,131 | 12/1985 | Miale | 208/111 |
| 4,559,315 | 12/1985 | Chang et al. | 502/71 |
| 4,617,108 | 10/1986 | Shyri et al. | 208/111 |
| 4,659,454 | 4/1987 | Varghese et al. | 208/111 |
| 4,666,692 | 5/1987 | Taramasso et al. | 423/326 |

Primary Examiner—Brian E. Hearn
Assistant Examiner—Andrew Griffis
Attorney, Agent, or Firm—Alexander J. McKillop; Charles J. Speciale; Dennis P. Santini

[57] ABSTRACT

A method for preparing an amorphous mixed oxide composition of enhanced catalytic activity is provided which involves extruding a mixture of silica with one or more other oxides, e.g. titania, gallia, alumina, etc., treating the extrudate with a basic aqueous alkali and/or alkaline earth solution and then treating the extrudate with an ammonium exchange solution.

11 Claims, No Drawings

ACTIVE AMORPHOUS MIXED OXIDES

BACKGROUND OF THE INVENTION

This invention relates to a method for manufacturing catalytically active amorphous mixed oxides containing a silica component by the steps of mixing a silica gel with one or more other oxides, extruding the mixture, treating the extrudate with an alkali or alkaline earth base solution at reflux or lower temperature, treating the base solution-treated extrudate by ammonium exchange, and calcining the ammonium-exchanged extrudate.

Inorganic oxides such as alumina or gallia are activated in U.S. Pat. Nos. 4,427,791 and 4,500,418 by contacting same with ammonium fluoride or volatile boron fluoride, followed by contacting with an aqueous ammonium exchange solution.

U.S. Pat. Nos. 4,477,582 and 4,559,131 teach a process for reactivating a catalyst composition comprising a crystalline zeolite having a silicon/aluminum atomic ratio of at least 3.5, the catalyst composition having been deactivated by contact with steam, by contacting the steam-deactivated composition with a metal salt solution, then by contacting with an aqueous ammonium ion-containing solution. Crystalline zeolite ZSM-5 may be the zeolite component of the catalyst composition.

U.S. Pat. Nos. 4,427,789; 4,500,420 and 4,538,016 show a method for enhancing the activity of a crystalline zeolite, including a zeolite having a silica-to-alumina ratio greater than 100, by compositing and extruding the zeolite with an alumina support matrix, vacuum impregnating the extrudate with an aqueous solution of an alkali metal fluoride, contacting the impregnated extrudate with a warm aqueous solution of an ammonium salt and then calcining the final product.

U.S. Pat. No. 4,513,091 teaches a method for introducing tetrahedrally bound aluminum into the structure of a high silica content crystalline zeolite and thereby increasing its acid catalytic activity by forming a mixture of the zeolite and an alumina, and hydrothermally treating the mixture with a dilute aqueous solution of sodium hydroxide at a temperature of about 80° C. to 370° C. and for a time effective to increase the tetrahedrally bound aluminum content of the zeolite. In U.S. Pat. No. 4,478,950, a crystalline high silica-containing zeolite, such as ZSM-5, is hydrothermally treated with aluminate ion to enhance its catalytic activity. U.S. Pat. No. 4,468,475 claims another hydrothermal activation method for enhancing acid catalytic activity of high-silica crystalline zeolite which comprises mixing the zeolite with an activating amount of alumina, and contacting the mixture of zeolite and alumina with an aqueous liquid medium at elevated temperature under conditions to increase catalytic activity of the zeolite.

U.S. Pat. Nos. 4,427,788 and 4,500,422 teach a method for enhancing the activity of a crystalline zeolite, including a zeolite having a silica-to-alumina ratio greater than 100, by impregnating the zeolite with an ammoniacal aluminum fluoride solution, contacting the impregnated zeolite with a warm aqueous solution of an ammonium salt and then calcining the final product.

U.S. Pat. Nos. 4,435,516 and 4,550,092 teach a method for enhancing the acid catalytic activity of a high silica crystalline zeolite having a silica/alumina mole ratio of greater than 500/1 by contacting it with an ammoniacal solution of an alkali metal aluminate for a period of time ranging from ½ hour to 5 days at a temperature of from 20° to 50° C. and at pH of at least 10.

U.S. Pat. No. 4,559,315 shows a method for increasing the ion-exchange capacity and acid catalytic activity of a crystalline zeolite by treatment of a physical mixture of the zeolite and an inorganic oxide with water in the presence of an alkali metal cation.

U.S. Pat. No. 4,427,787 the acid catalytic activity of a synthetic crystalline zeolite, including a zeolite having a silica-to-alumina ratio greater than 100, is enhanced by compositing the zeolite with an alumina support matrix and reacting the extrudate thereof with a dilute aqueous solution of hydrogen fluoride.

High alumina content zeolites, such as zeolites X and Y, have been enhanced in catalytic utility by treatment with volatile metal halides, such as aluminum chloride, resulting in ion exchange. This is shown in U.S. Pat. Nos. 3,354,078 and 3,644,220.

Applicants know of no prior art teaching the present invention where amorphous mixed oxides are prepared in catalytically active form.

SUMMARY OF THE INVENTION

The present invention relates to a new method for providing an amorphous mixed oxide extrudate having enhanced acid catalytic activity. The method involves extruding a mixture of a silica component and at least one other oxide component, treating the resulting extrudate with an alkali or alkaline earth base solution, treating the base solution-treated extrudate by ammonium exchange, and calcining the product of ammonium exchange.

EMBODIMENTS

The present invention relates to a novel method for providing certain amorphous mixed oxide materials containing a silica component, such as, for example, primarily binary compositions including silica-alumina, silica-magnesia, silica-zirconia, silica-thoria, silica-beryllia, silicophosphate, aluminosilicate, borosilicate, vanadosilicate, ferrosilicate, titanosilicate and silica-titania, as well as primarily ternary compositions, such as silica-aluminum-thoria, silica-alumina-zirconia, silica-alumina-magnesium, silicoaluminophosphate and silica-magnesia-zirconia. The amorphous mixed oxide materials hereby prepared have enhanced acid catalytic activity when compared to similar amorphous materials prepared in another way. The presently prepared materials have an Alpha Value of greater than 1.

The method comprises a first necessary step of extruding a relatively homogeneous mixture of amorphous silica, such as silica gel, and one or more amorphous oxides of elements selected from the group consisting of Periodic Table of the Elements groups IIA (e.g. Mg and Be), IIIA (e.g. Al, B, Ga and In), VA (e.g. P), VIII (e.g. Fe), IIIB (e.g. La and Th), IVB (e.g. Ti) and VB (e.g. V). The mixture will comprise from about 20 to about 80 percent by weight amorphous silica component. The extrusion will be through a standard die, such as, for example, a 1/16" or 1/32" die, and may be at a pressure of of up to about 50 tons per square inch, such as from about 2, preferably at least about 5 tons per square inch. Water will be added as needed to the mixture prior to extrusion. The mixture may be mulled prior to extrusion, if desired.

The second necessary step of the present method comprises treating the extudate of the first necessary step with an aqueous alkali and/or alkaline earth solution having a pH of from about 9 to about 14 (about 0.2M to about 10M) at a temperature of from about 40° C. to reflux and never more than reflux, for a time of from about 5 minutes to about 48 hours.

The alkali element of the solution required of the second necessary step is preferably selected from sodium, potassium and mixtures thereof. This solution is made by adding a suitable alkali or alkaline earth compound, e.g. halide, carbonate, or hydroxide, such as, for example, $Na_2CO_3$, $K_2CO_3$, NaF, KF, NaOH and/or KOH to water in quantities enabling the final solution pH to be from about 10 to about 12.

The third necessary step of the present method comprises treating the second necessary step product extrudate with an aqueous ammonium exchange solution. The aqueous ammonium exchange solution contacting step may be conducted for a period of time of from about 1 to about 20 hours at a temperature of from ambient to about 100° C. The actual ammonium exchange material which may be used is not narrowly critical and will normally be an inorganic salt, such as, for example, ammonium nitrate, ammonium sulfate, ammonium chloride or ammonium hydroxide.

To realize the full benefit of the above three necessary steps, the third necessary step product will be calcined at a temperature of from about 200° C. to about 600° C. in an inert atmosphere of air, nitrogen, etc., at subatmospheric, atmospheric or superatmospheric pressure for a time sufficient to remove ammonia, e.g. from about 1 minute to about 48 hours.

Other steps finding utility in the present method include drying the extrudate product of the first necessary step, such as by heating to a temperature of from about 100° C. to about 600° C. for a sufficient time, and/or washing, such as with water, the products of the second and third necessary steps of treating the extrudate of the first necessary step with basic aqueous alkali and/or alkaline earth solution and treating the product of the second necessary step with an aqueous ammonium exchange solution.

The activity-enhanced amorphous mixed oxide material prepared by the present method is useful as a catalyst component for acid catalyzed organic compound conversion reactions where an Alpha Value of greater than 1 is required. Such reactions include, as non-limiting examples, cracking of hydrocarbons, wherein the reaction conditions include a temperature of from about 300° C. to about 800° C., a pressure of from about 15 psia to about 500 psia, and a weight hourly space velocity of from about 0.1 $hr^{-1}$ to about 20 $hr^{-1}$; and conversion of methanol to gasoline wherein the reaction conditions include a temperature of from about 300° C. to about 550° C., a pressure of from about 5 psia to about 500 psia, and a weight hourly space velocity of from about 0.1 $hr^{-1}$ to about 100 $hr^{-1}$.

Other reactions for use of the activity-enhanced amorphous mixed oxide material product of the present method include, as non-limiting examples, isomerizing xylene feedstock components to product enriched in p-xylene with reaction conditions including a temperature of from about 100° C. to about 600° C., a pressure of from about 0 psig to about 1000 psig, a weight hourly space velocity of from about 0.1 $hr^{-1}$ to about 200 $hr^{-1}$ and a hydrogen/hydrocarbon mole ratio of from about 0 to about 100; disproportionating toluene to product comprising benzene and xylenes with reaction conditions including a temperature of from about 100° C. to about 760° C., a pressure of from about 14 psig to about 900 psig and a weight hourly space velocity of from about 0.1 $hr^{-1}$ to about 20 $hr^{-1}$; alkylating aromatic hydrocarbons, e.g. benzene and alkylbenzenes, in the presence of an alkylating agent, e.g. olefins, formaldehyde, alkyl halides and alcohols, with reaction conditions including a temperature of from about 100° C. to about 650° C., a pressure of from about 0 psig to about 2950 psig, a weight hourly space velocity of from about 0.5 $hr^{-1}$ to about 2000 $hr^{-1}$ and a feedstock aromatic hydrocarbon/alkylating agent mole ratio of from about 1/1 to about 20/1; and transalkylating aromatic hydrocarbons in the presence of polyalkylaromatic hydrocarbons with reaction conditions including a temperature of from about 100° C. to about 760° C., a pressure of from about 0 psig to about 2950 psig, a weight hourly space velocity of from about 1 $hr^{-1}$ to about 1000 $hr^{-1}$ and a feedstock aromatic hydrocarbon/polyalkylaromatic hydrocarbon mole ratio of from about 1/1 to about 16/1.

In practicing a particularly desired chemical conversion process, it may be useful to incorporate the above-described activity-enhanced amorphous mixed oxide material, especially when used as matrix in a zeolite-containing catalyst composition, with additional matrix comprising another material resistant to the temperature and other conditions employed in the process. Such additional matrix material is useful as a binder and imparts additional resistance to the catalyst for the severe temperature, pressure and reactant feed stream velocity conditions encountered in many cracking processes.

Useful additional matrix materials include both synthetic and naturally occurring substances, as well as inorganic materials such as clay, silica and/or metal oxides. The latter may be either naturally occurring or in the form of gelatinous precipitates or gels including mixtures of silica and metal oxides. Naturally occurring clays which can be composited with the zeolite include those of the montmorillonite and kaolin familes, which families include the sub-bentonites and the kaolins commonly known as Dixie, McNamee, Georgia and Florida clays or others in which the main mineral constituent is halloysite, kaolinite, dickite, nacrite or anauxite. Such clays can be used in the raw state as originally mined or initially subjected to calcination, acid treatment or chemical modification.

In addition to the foregoing additional matrix materials, the catalyst employed herein may be composited with an addition porous matrix material prepared in a customary way such as alumina, silica-alumina, silica-magnesia, silica-zirconia, silica-thoria, silica-beryllia, and silica-titania, as well as ternary compositions, such as silica-alumina-thoria, silica-alumina-zirconia, silica-alumina-magnesia and silica-magnesia-zirconia. The additional matrix may be in the form of a cogel. The relative proportions of presently prepared activity-enhanced amorphous mixed oxide component and additional matrix, on an anhydrous basis, may vary widely with the activity-enhanced amorphous material content of the overall catalyst ranging from about 1 to about 99 percent by weight and more usually in the range of about 5 to about 80 percent by weight of the total dry composite.

The following examples will illustrate the novel method of the present invention. In the examples, when Alpha Value is examined, it is noted that the Alpha Value is an approximate indication of the catalytic cracking activity of the catalyst compared to a standard catalyst and it gives the relative rate constant (rate of normal hexane conversion per volume of catalyst per unit time). It is based on the activity of a highly active silica-alumina cracking catalyst prepared by conventional methods taken as an Alpha of 1 (Rate Constant=0.016 sec$^{-1}$). The Alpha Test is described in U.S. Pat. No. 3,354,078 and in *The Journal of Catalysts*, Vol. IV, pp. 522–529 (August 1965), each incorporated herein as to that description. It is noted that intrinsic rate constants for many acid-catalyzed reactions are proportional to the Alpha Value for a particular crystalline silicate catalyst, i.e., the rates for toluene disproportionation, xylene isomerization, alkene conversion and methanol conversion (see "The Active Site of Acidic Aluminosilicate Catalysts", *Nature*, Vol. 308, No. 5969, pp. 589–591, 14 June 1984).

When ammonia temperature programmed desorption (TPD) is examined, the test used is decribed in *Thermochim. Acta* 1971, 3, 113 by G. T. Kerr and A. W. Chester.

EXAMPLE 1

A source of silica comprising precipitated hydrated SiO$_2$ and containing about 6 wt.% free H$_2$O and about 4.5 wt.% bound H$_2$O of hydration and having an ultimate particle size of about 0.02 micron was mixed with alpha-alumina monohydrate to provide a SiO$_2$/Al$_2$O$_3$ molar ratio of 1/1. To this mixture was added enough water to form an extrudable paste. Following mulling, the mixture was then extruded through a 1/16-inch die. The resulting extrudate was then heated at 105° C. until dry.

EXAMPLE 2

A 2 g sample of the dried Example 1 product extrudate was treated with ammonium exchange solution by contact with 1N NH$_4$NO$_3$ for 2 hours at 30° C., followed by calcination at 538° C. in air for 4 hours. The product of this example exhibited a TPD value of less than 0.005 meq/g and an Alpha Value of 0.5.

EXAMPLE 3

A separate 20 g sample of the dried Example 1 product extrudate was refluxed in 0.5M Na$_2$CO$_3$ solution (pH=11) for 2 hours, washed with water to be free of carbonate, then treated with ammonium exchange solution and calcined exactly as in Example 2. The product of this example exhibited a TPD value of 0.161 meq/g and an Alpha Value of 1.5.

EXAMPLE 4

A separate sample of the dried Example 1 product extrudate is refluxed in 0.5M NaF (pH=10) for 2 hours, washed with water until free of fluoride, then ammonium exchanged and calcined as in Example 2. The product of this example exhibits a TPD value of greater than 0.1 meq/g and an Alpha Value of greater than 1.

EXAMPLE 5

In identical reaction vessels, the products of Examples 2 and 3 were further evaluated for catalytic activity by passing therethrough feedstock comprising xylenes and ethylbenzene. The reaction temperatures and weight hourly space velocities were varied with analysis of products indicating the following values:

| Catalyst | Example 2 | Example 3 |
|---|---|---|
| Temperature = 427° C. | | |
| WHSV = 3.17 hr$^{-1}$ | | |
| p-Xylene Approach to Equilibrium, % | 46.58 | 85.54 |
| Ethylbenzene Conversion, wt. % | 1.96 | 2.52 |
| Temperature = 480° C. | | |
| WHSV = 3.17 hr$^{-1}$ | | |
| p-Xylene Approach to Equilibrium, % | 60.63 | 100.40 |
| Ethylbenzene Conversion, wt. % | 4.39 | 7.55 |
| Temperature = 480° C. | | |
| WHSV = 0.87 hr$^{-1}$ | | |
| p-Xylene Approach to Equilibrium, % | 98.65 | 101.13 |
| Ethylbenzene Conversion, wt. % | 8.84 | 30.82 |

It is observed from this data that when the first, second and third necessary steps of the present method are performed in proper order on an amorphous mixed oxide compositon as above described, an enhancement in acid catalytic activity is realized. The Example 3 product extrudate had 3 times the Alpha activity as the Example 2 product. It had more than 32 times the TPD value. The Example 3 product also provided uniformly higher approach to p-xylene equilibrium by isomerization of xylenes over a range of reaction temperature and space velocity. Conversion of ethylbenzene was also uniformly higher over the Example 3 product extrudate throughout a range of reaction temperature and space velocity.

What is claimed is:

1. A method for manufacturing an amorphous mixed oxide containing silica and having an Alpha Value of greater than 1 which comprises steps of (1) extruding a mixture of amorphous silica and one or more amorphous oxides of elements selected from the group consisting of Periodic Table groups IIA, IIIA, VA, VIII, IIIB, IVB and VB, (2) treating the extrudate of step (1) with an aqueous alkali solution or alkaline earth solution of from about 0.2M to about 10M at a temperature of from about 40° C. to reflux, (3) treating the product of step (2) with an aqueous ammonium exchange solution and (4) calcining the product of step (3).

2. The method of claim 1 wherein said mixture comprises from about 20 to about 80 percent by weight said amorphous silica.

3. The method of claim 1 wherein said extrudate of step (1) is treated with an aqueous alkali solution comprising sodium, potassium or a mixture thereof.

4. The method of claim 3 wherein said alkali solution comprises a compound selected from the group consisting of a halide, carbonate and hydroxide.

5. The method of claim 4 wherein said compound is Na$_2$CO$_3$, K$_2$CO$_3$, NaF, KF, NaOH or KOH.

6. The method of claim 1 wherein said aqueous ammonium exchange solution of step (3) comprises an ammonium salt selected from the group consisting of nitrate, sulfate, choride and hydroxide.

7. The method of claim 1 wherein the extrudate of step (1) is dried prior to treating step (2).

8. The method of claim 7 wherein said drying comprises heating at a temperature of from about 100° C. to about 600° C.

9. The method of claim 1 wherein said mixture comprises silica and one or more amorphous oxides of elements selected from the group consisting of magnesium, beryllium, aluminum, boron, gallium, indium, phosphorus, iron, lanthanum, thorium, titanium and vanadium.

10. The method of claim 1 wherein said mixture comprises silica and a component selected from the group consisting of alumina, magnesia, zirconia, thoria, beryllia, phosphate, titania and mixtures thereof.

11. A method for manufacturing an amorphous mixed oxide having an Alpa Value of greater than 1 which comprises steps of (1) extruding a mixture comprising from about 20 weight percent to about 80 weight percent amorphous silica and from about 80 weight percent to about 20 weight percent amorphous alumina, (2) treating the extrudate product of step (1) with an aqueous alkali solution comprising sodium, potassium or a mixture thereof of from about 0.2M to about 10M at a temperature of from about 40° C. to reflux, (3) treating the product of step (2) with an aqueous ammonium exchange solution comprising an ammonium salt and (4) calcining the product of step (3) at a temperature of from about 200° C. to about 600° C. in an inert atmosphere.